No. 661,758. Patented Nov. 13, 1900.
J. G. DOUGHTY.
OIL FILTER.
(Application filed June 20, 1900.)
(No Model.)
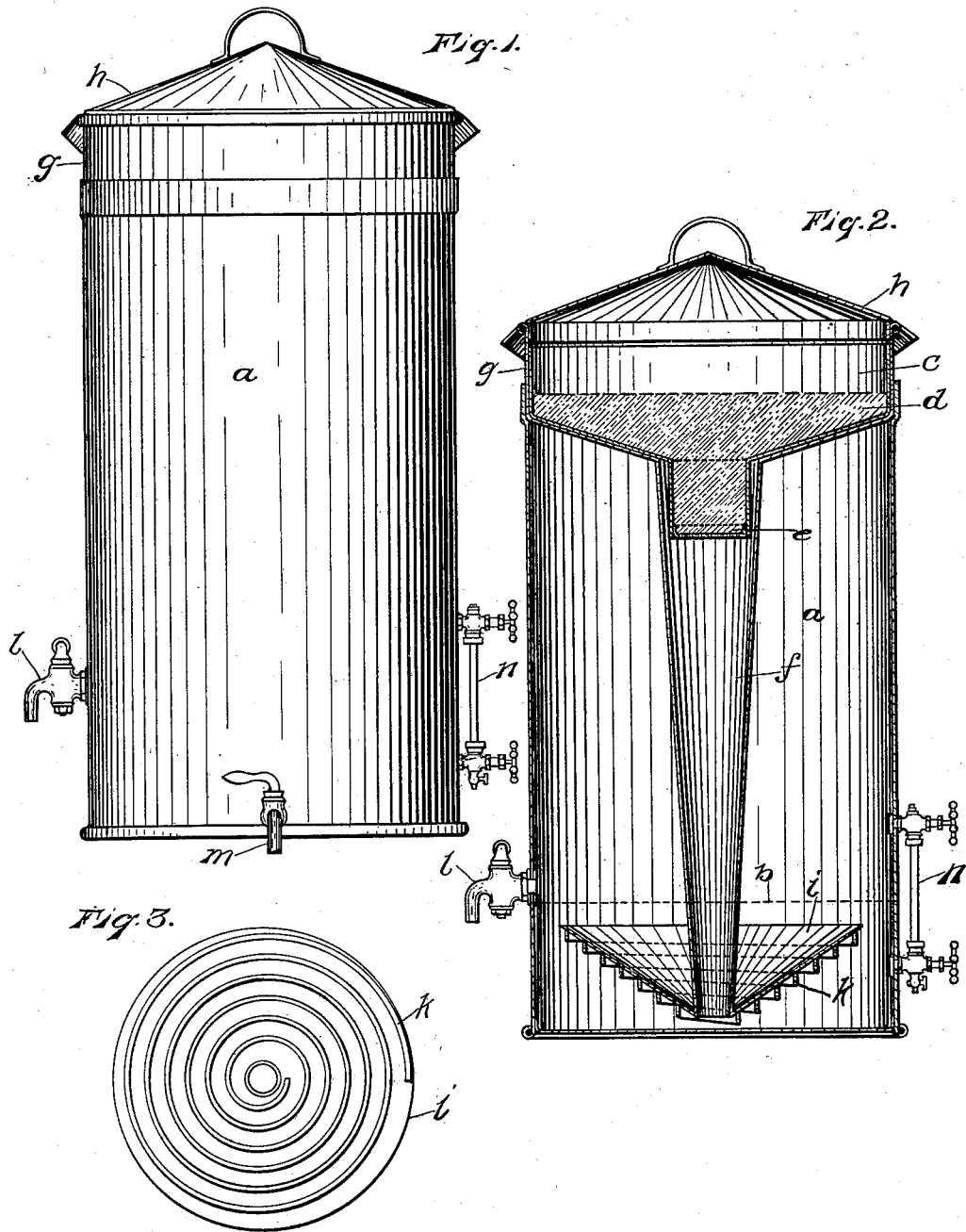
Witnesses
M. H. Flynn
Lutgard Morba
Inventor
John G. Doughty
By W. E. Simonds
Atty

UNITED STATES PATENT OFFICE.

JOHN G. DOUGHTY, OF WINSTED, CONNECTICUT, ASSIGNOR OF ONE-HALF TO WILLIAM E. SIMONDS, OF CANTON, CONNECTICUT.

OIL-FILTER.

SPECIFICATION forming part of Letters Patent No. 661,758, dated November 13, 1900.

Application filed June 20, 1900. Serial No. 21,014. (No model.)

*To all whom it may concern:*

Be it known that I, JOHN G. DOUGHTY, a citizen of the United States of America, residing and having post-office address at Winsted, in the county of Litchfield and State of Connecticut, have invented a certain new and useful improvement in devices for passing a lighter fluid through and in contact with a heavier fluid, of which the following is a description, reference being had to the accompanying drawings, wherein—

Figure 1 is an elevational view of a device embodying the said improvement. Fig. 2 is a view of the same thing in central vertical section. Fig. 3 is a view of the face of the so-called "detainer," described hereinafter.

The object of the improvement is the production of an apparatus for passing a lighter fluid through a heavier one, the two being in contact and meanwhile so detaining the lighter fluid in its passage through the heavier as to prolong the time of contact and increase the effect for which the one fluid is passed through the other.

An additional feature of the invention is the provision of means for the filtration of the lighter fluid preparatory to its passage through the heavier fluid.

The apparatus is herein described as applied to the filtration and washing by contact with water of oil that has been used as a lubricant upon the bearings of machinery and the like.

In the accompanying drawings the letter *a* denotes a tank which, as well as most of the other parts of the apparatus, may well be made of sheet-iron coated with zinc, a material which in America is commonly called "galvanized iron," and if, as may in practice be the fact, this tank be assumed to be sixteen inches in diameter the scale of the drawing affords means for determining with suitable working accuracy the dimensions of the other parts. Within this tank is contained water to about the height of the dotted line *b*, and that space is mentioned hereinafter as the "heavier-fluid" space.

The letter *c* denotes a filter-case, and *d* the filtering matter contained therein, which for the filtration of machine-oil is preferably coarse pine sawdust. The lower end of the filter-case is closed by a perforated screw-cap *e*. It will be readily understood that the oil is placed within the filter-case and filtered through the filtering-bed. The oil coming from the filter drops into the pipe *f*, which is by preference integral with the pan *g*. That pan practically holds the filter-case, and by preference has a cover *h*. On the lower end of the pipe *f* is what may be called a "detainer," having a surface approaching the conical in shape, on which is fixed a spiral wall *k*, giving a spiral lane on a conical surface for the oil. When sufficient oil accumulates in the pipe *f*, it is forced out at the lower end thereof, and being lighter or of less specific gravity than the water it tends to rise through the water; but the spiral wall detains it, forces it to follow a spiral path in its ascent, and thereby keep the oil much longer in contact with the water than would be the case except for the presence of the detainer. This contact of the oil with the detainer has also the effect to agitate and disturb the oil and so cause it to part with more of its impurities than would otherwise be the case. The filtered and washed oil accumulates within the tank above the water and may be drawn off through the faucet *l*. The water itself may be drawn off through the faucet *m*. By means of the glass tube *n*, which at the lower end communicates with the heavier-fluid space and at the upper end with the lighter-fluid space, the division-line between the two is readily seen from the outside.

I claim as my improvement—

1. In combination, in an apparatus for passing a lighter fluid through a heavier one and in contact therewith—the tank adapted to contain the heavier fluid, means for introducing the lighter fluid into the heavier-fluid space, and the detainer having a spiral ascending lane for the lighter fluid on its conical surface; all substantially as described and for the purposes set forth.

2. In combination, the tank, the pipe adapted to conduct the lighter fluid into the heavier-fluid space, the filter delivering into said pipe, and the detainer having a spiral ascending lane for the lighter fluid on its conical surface, all substantially as described and for the purposes set forth.

JOHN G. DOUGHTY.

Witnesses:
JOSEPH R. SANFORD,
ELEANOR T. DOUGHTY.